United States Patent [19]

Krauss et al.

[11] Patent Number: 4,793,529

[45] Date of Patent: Dec. 27, 1988

[54] EMPTYING DEVICE FOR A BULK SILO

[75] Inventors: Werner Krauss; Karl-Heinz Matthies, both of Hamburg, Fed. Rep. of Germany

[73] Assignee: Claudius Peters AG, Fed. Rep. of Germany

[21] Appl. No.: 76,342

[22] Filed: Jul. 22, 1987

[30] Foreign Application Priority Data

Jul. 23, 1986 [DE] Fed. Rep. of Germany ....... 3624885

[51] Int. Cl.⁴ .............................................. B65G 65/00

[52] U.S. Cl. .................................... 222/637; 222/195; 406/90; 406/137; 414/288

[58] Field of Search ............... 222/195, 630, 636, 637, 222/251, 564, 561; 406/90, 91, 108, 137, 138, 70, 120; 414/288

[56] References Cited

U.S. PATENT DOCUMENTS

| | | | |
|---|---|---|---|
| 3,976,232 | 8/1976 | Heidebroek | 406/91 |
| 4,078,703 | 3/1978 | Dressler | 406/91 |
| 4,375,335 | 3/1983 | Klein-Albenhausen | 222/637 X |
| 4,382,723 | 5/1983 | Moller | 222/195 X |
| 4,470,704 | 9/1984 | von Wedel | 222/195 X |
| 4,566,232 | 1/1986 | Klein-Albenhausen | 222/561 X |
| 4,671,030 | 6/1987 | Krauss | 222/564 X |

FOREIGN PATENT DOCUMENTS 975271 10/1961 Fed. Rep. of Germany ........ 406/90

*Primary Examiner*—Kevin P. Shaver
*Attorney, Agent, or Firm*—Eric P. Schellin

[57] ABSTRACT

The emptying device for a bulk silo (1) with flat or slightly inclined silo bottom (8) comprises an outer slope (2) and open air transport grooves (7) distributed over the silo bottom (8). The air driven conveying chutes (7) extend radially to a ventilated annular chamber (3) located inside the outer slope (2) of the silo bottom (8), the bottom of which annular chamber is provided with open air driven conveying chutes (4) and is inclined toward the discharge opening (5). The bottom of the annular chamber (3) is located lower than the silo bottom (8).

5 Claims, 2 Drawing Sheets

Fig. 2
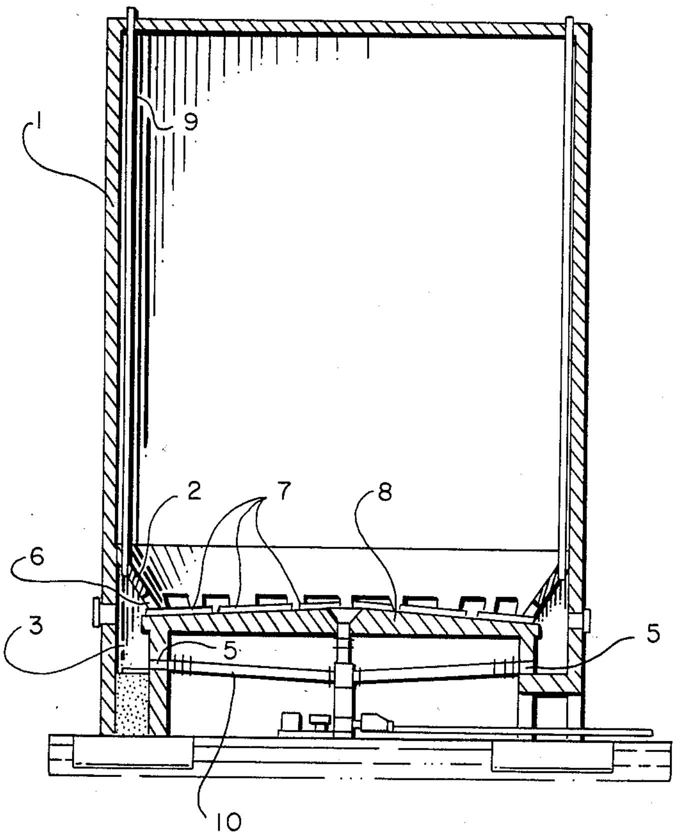
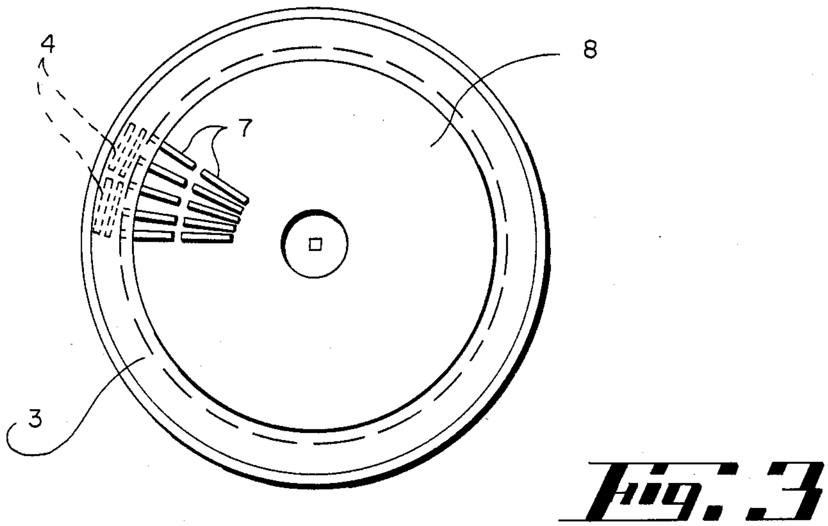
Fig. 3

EMPTYING DEVICE FOR A BULK SILO

BACKGROUND OF THE INVENTION

The invention relates to an emptying device for a bulk silo with a flat or slightly inclined silo bottom, outer slope and open air driven conveying chutes distributed over the silo bottom which run to a ventilated annular chamber located inside the outer slope of the silo bottom, the bottom of which annular chamber is provided with open air driven conveying chutes and is inclined toward the discharge opening.

Such a known emptying device (DE-PS No. 23 36 984) can be used very effectively to empty in particular large-diameter silos, whereby the basic concept of the known ventilated emptying and pressure-release chamber is employed. This device avoids in particular the depositing of considerable amounts of the bulk material in the vicinity of the silo wall which gradually solidify and can no longer be removed. The mentioned DE-PS No. 23 36 984 is incorporated herein by reference in its entirety.

In order that the ventilating processes in the silo bottom and in the annular chamber do not have an adverse effect on each other, the corresponding air driven conveying chutes must have a certain distance from each other. For this reason, the essentially radially extending air driven conveying chutes of the silo bottom do not quite extend to the essentially circumferential air driven conveying chutes of the annular chamber. Cones or walls of material can form in the intermediary area which can hinder the effective operation, especially in the case of material which is not very stable in storage and solidifies very rapidly. Such materials which are not very stable in storage and solidify readily are e.g. flue dust with its properties which vary according to the type of coal and the firing conditions.

The invention has the object of creating an emptying device which can be used with good effect for bulk materials which are not very stable in storage.

The invention solves this object by making the bottom of the annular chamber lower than the silo bottom.

Having a lower position does not mean in this instance that parts of the annular chamber bottom are lower, as is also the case in the previously known devices, namely, in the vicinity of the discharge opening. Rather, the entire annular conduit is intentionally placed lower so that the ventilated bottoms of the silo and of the annular chamber are distinctly displaced from each other. The bottom of the annular chamber should be at least 50 cm lower than the silo bottom. It has proven to be especially advantageous if the bottom of the annular conduit is 1 to 5 m lower. Again, it is particularly advantageous if the bottom is 2 to 3 m lower than the silo bottom.

Due to the separation in height between silo bottom and annular chamber bottom, the air driven conveying chutes of the silo bottom can be run right into the annular chamber. Thus, no unventilated areas remains here in which said materials, walls or cones can form and gradually solidify.

The emptying device operate so effectively that it is even possible to use smaller values for the slope angle than in the past. While the slope angle of the outer slope was previously approximately 60° to 70°, this slope angle can now be 50° to 55° relative to the horizontal. Since the material slides less readily over such a less steep slope, it is effectively braked here, which aids in even emptying and prevents too much material from passing at the same time into the annular conduit.

This lesser slope angle has the essential advantage that when the slope is made of concrete, no double shell is necessary any longer, that is, a shell which covers the area for the concrete above and below, but rather only one single shell upon which the concrete is applied during construction. The concrete can not slip off on account of the lesser slope angle and need only be subjected to a smoothing surface treatment after it hardens.

It is advantageous if the air driven conveying chutes of the silo bottom extend into the annular chamber so that the material does not fall down at the edge of the annular chamber but rather more towards the center so that it can not back up on the edge and possibly form more downs.

It is also possible in accordance with the invention as a result of the vertical spatial displacement of silo bottom and annular chamber bottom to load the air driven conveying chutes of the annular chamber with a lesser air pressure than the air driven conveying chutes of the silo bottom. This entails the following advantage.

A relatively greater air pressure must always be used for the silo bottom so that the material can be effectively fluidized. If an equally great air pressure is not selected for the annular chamber but rather a lower air pressure, then the discharge speeds of the material from the discharge opening or the discharge openings are also decreased so that the wear on the discharge slides or dosing devices is diminished. Foreign bodies and developing granulates are primarily responsible for this wear which can not do as much damage at the lower discharge speeds. The danger of clogging also drops, since the openings no longer have to be as small as was previously necessary for a careful discharging of the exiting material.

The invention also achieves the surprising advantage that the intensive circular flow within the annular chamber to the discharge opening occurs independently of the radial flows of the silo bottom. It is possible thereby, as is known, for particular cyclically different areas of the air driven conveying chutes of the silo bottom to be loaded with compressed air so that the material can not solidify anywhere.

The invention is described in the following in advantageous embodiments with reference made to the drawings.

FIG. 2 shows another embodiment of the invention in a side view in section.

FIG. 3 shows the silo bottom of the silo of FIG. 2 in a top view.

Figure 1:
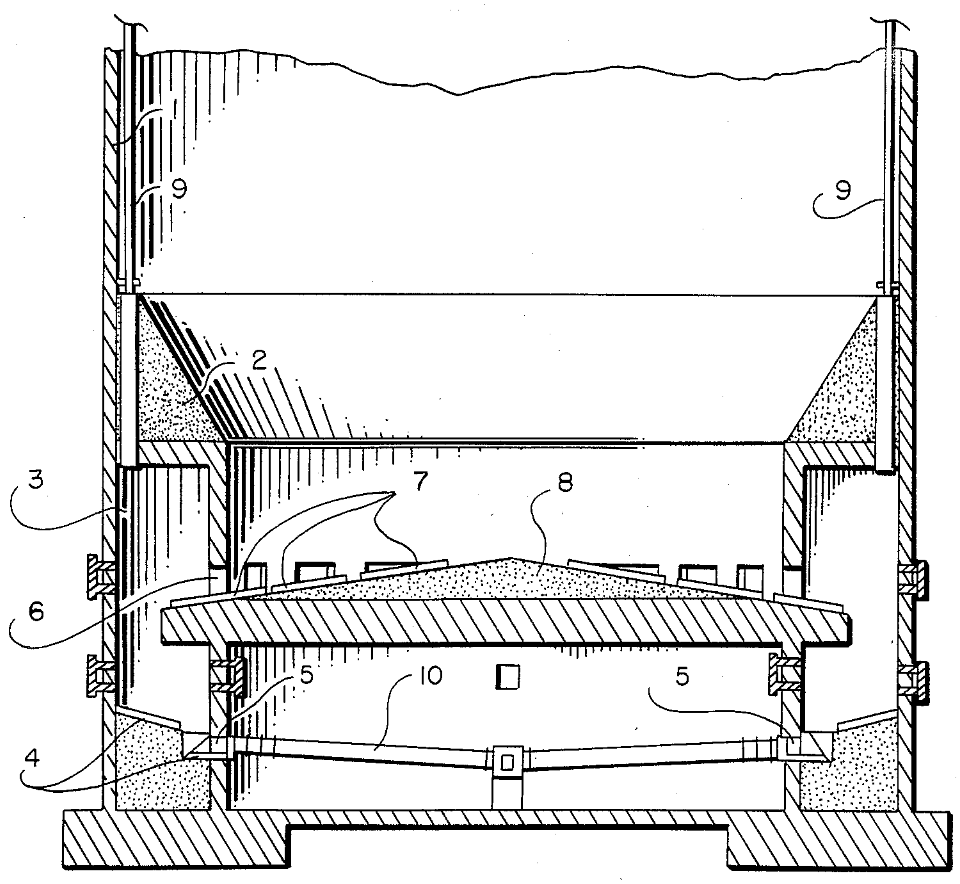
FIG. 1 shows an embodiment of the invention in a side view in section.

FIG. 1 shows a round silo 1, whereby the upper silo part with the silo filling devices, which do not belong to the subject matter of the invention, are not shown. The silo comprises a circumferential silo slope 2 which slopes down from the vertical silo wall to the silo bottom. Annular chamber 3, whose bottom is provided with open air driven conveying chutes 4, is located inside silo slope 2 and under it. The material leaves the annular chamber via discharge openings 5 and is transported away via other air driven conveying chutes 10.

Material infeed openings 6, into which the radial air driven conveying chutes 7 of the silo bottom 8 extend, are located on the vertical part of silo slope 2 approximately halfway up annular conduit 3.

Ventilation is located in the upper part of annular chamber 3. The corresponding ventilation lines are designated by 9.

The infeed openings to annular chamber 3 can be varied in their opening section by adjusting slides which are not shown. These slides can be actuated via linkages, e.g. from outside of or below the silo.

As a result of the two-story design of the emptying device, the material falls from above into annular chamber 3 and is then transported by air driven conveying chutes 4 to discharge openings 5. The two-story design also has the advantage that annular chamber 3 is accessible both from the interior of the silo and also from the outside.

The embodiment of FIG. 2 shows a somewhat different geometric arrangement; however, the essential parts are the same as in the embodiment of FIG. 1.

FIG. 3 shows only the radial arrangement of air driven conveying chutes 7 of silo bottom 8 and the orientation of air driven conveying chutes 4 of annular chamber 3, which run in an essentially circumferential direction.

The bottom of annular chamber 3 is inclined in such a manner that it slopes in a more or less even manner down to discharge openings 5 so that the material is transported via the air driven conveying chutes from the entire annular chamber to discharge openings 5.

We claim:

1. A silo for bulk material comprising: a vertical silo housing (1) having an inclined bottom wall (8) terminating within a ventilate annular chamber (3); a circumferential inwardly sloped wall (2) from a vertical wall of said silo housing, spaced above said bottom wall (8) and over said annular chamber (3); a plurality of openings (6) between said sloped wall (2) and said bottom wall (8) leading into said annular chamber (3); said annular chamber (3) having a bottom wall lower than the bottom wall of the silo and downwardly inclined towards the vertical axis of the silo to a plurality of spaced apart discharge openings (5); a plurality of radially extending open air driven conveying chutes (7) distributed over the bottom wall (8) of the silo, through said openings (6) and terminating within said annular chamber (3); and a plurality of circumferentially arranged air driven conveying chutes (4) on said bottom wall of said annular chamber (3) directed towards said discharge openings (5).

2. The silo according to claim 1, characterized in that the bottom wall of the annular chamber (3) is located at least 50 cm lower than the bottom wall (8) of the silo.

3. The silo according to claim 2, characterized in that the bottom wall the annular chamber (3) is located approximately 1 to 5 m, advantageously 2 to 3 m lower than the silo bottom (8).

4. The silo according to claim 3, characterized in that said circumferential inwardly sloped wall (2) has an angle of 50° to 55° relative to the horizontal.

5. The silo according to claim 4, characterized in that the air driven conveying chutes (4) of the bottom wall of the annular chamber (3) are loaded with a lesser air pressure than the open air driven conveying chutes (7) of the bottom wall (8) of the silo.

* * * * *